United States Patent
Subbaian et al.

(10) Patent No.: US 9,681,023 B1
(45) Date of Patent: Jun. 13, 2017

(54) IMAGE PROCESSING METHOD AND SYSTEM FOR CLASSIFICATION OF HALFTONE FREQUENCIES

(71) Applicant: XEROX CORPORATION, Norwalk, CT (US)

(72) Inventors: Sudhagar Subbaian, Coimbatore (IN); Vignesh Doss, Palanichettipatti (IN); Sainarayanan Gopalakrishnan, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/246,676

(22) Filed: Aug. 25, 2016

(51) Int. Cl.
*G06K 15/00* (2006.01)
*H04N 1/405* (2006.01)
*G06K 9/00* (2006.01)

(52) U.S. Cl.
CPC ......... *H04N 1/405* (2013.01); *G06K 9/00456* (2013.01); *H04N 2201/0094* (2013.01)

(58) Field of Classification Search
CPC ........... H04N 1/405; H04N 2201/0094; G06K 9/00456
See application file for complete search history.

(56) References Cited

U.S. PATENT DOCUMENTS

2004/0114185 A1* 6/2004 Shiau ................. G06K 9/00456
358/2.1
2005/0271277 A1* 12/2005 Lin .................... H04N 1/40062
382/191

* cited by examiner

*Primary Examiner* — Quang N Vo

(57) ABSTRACT

The disclosed embodiments illustrate an image processing method and system for classification of halftone frequencies. Pixel values of a first pixel block in a binary image are converted into first pixel values. A second pixel block comprising second pixel values is generated, based on pixel shifting in the first pixel block by a pre-determined count. A frequency value for a pixel-of-interest in the first pixel block is determined, based on a count of a pre-specified type of third pixel values. Other plurality of frequency values for other pixels-of-interest in other plurality of first pixel blocks are estimated when a mode value, corresponding to a plurality of frequency values of pixels-of-interest in a plurality of first pixel blocks, exceeds a pre-determined threshold mode value. Based on the determined plurality of frequency values, one or more image processing operations on the binary image are performed.

19 Claims, 5 Drawing Sheets

IMAGE PROCESSING METHOD AND SYSTEM FOR CLASSIFICATION OF HALFTONE FREQUENCIES

TECHNICAL FIELD

The presently disclosed embodiments are related, in general, to image processing. More particularly, the presently disclosed embodiments are related to an image processing method and system for classification of halftone frequencies.

BACKGROUND

With ever-increasing advancements in the field of multi-function devices (MFDs), there is observed an augmented printing of documents comprising text, image, and/or graphic objects. In a print path, an electronic device, such as a high resolution scanner, scans a document and transmits the scanned document to an MFD, such as a digital printer. The MFD may perform halftoning of the received scanned document for printing. However, during halftoning, the quality of the scanned document may degrade and an obvious screen pattern, due to the moiré effect, may be observed. In order to increase the quality of the halftoned document, and avoid the moiré effect, de-screening and enhance filters may be selected based on the halftone frequency.

In certain scenarios, a halftone frequency corresponding to a scanned document may be different from a halftone frequency corresponding to another scanned document. Even for a single scanned document, there may exist multiple halftone frequency components. Thus, in such scenarios, it may be utmost critical to determine one or more halftone frequency components corresponding to the scanned image. Currently, various technologies, such as complex neighborhood, frequency transformation, application-specific integrated circuit (ASIC) based image processing, and software-based image processing techniques, are utilized to determine halftone frequency components corresponding to a scanned document. However, such technologies are relatively complex and expensive to implement in a software-based image path, thus, these technologies have only been used in high-end production scanning systems. Thus, a simple and efficient image processing technique is desirable that may be utilized to estimate halftone frequencies.

Further limitations and disadvantages of conventional and traditional approaches will become apparent to one of skilled in the art through a comparison of the described systems with some aspects of the present disclosure, as set forth in the remainder of the present application and with reference to the drawings.

SUMMARY

According to embodiments illustrated herein, there is provided an image processing method and system for classification of halftone frequencies. The image processing method includes converting, by an input image processor in a multifunction device, pixel values of a first pixel block, associated with a pixel-of-interest, into first pixel values, wherein the first pixel block is one of a plurality of first pixel blocks in a binary image. The image processing method further includes generating a second pixel block comprising second pixel values based on pixel shifting in the first pixel block of the plurality of first pixel blocks by a pre-determined count. The image processing method further includes determining a frequency value for the pixel-of-interest in the first pixel block based on a count of a pre-specified type of third pixel values in a corresponding third pixel block, wherein the third pixel values in the third pixel block are determined based on a pre-specified operation on the first pixel values of the first pixel block and the second pixel values of the second pixel block. The image processing method further includes estimating other plurality of frequency values for other pixels-of-interest in other plurality of first pixel blocks when a mode value, corresponding to a plurality of frequency values of pixels-of-interest in the plurality of first pixel blocks, exceeds a pre-determined threshold mode value. The image processing method further includes performing one or more image processing operations on the binary image based on the determined plurality of frequency values corresponding to the pixels-of-interest in the plurality of first pixel blocks and the estimated other plurality of frequency values corresponding to the other pixels-of-interest in the other plurality of first pixel blocks.

According to embodiments illustrated herein, there is provided an image processing system for classification of halftone frequencies. The image processing system includes an input image processor configured to convert pixel values of a first pixel block, associated with a pixel-of-interest, into first pixel values, wherein the first pixel block is one of a plurality of first pixel blocks in a binary image. The input image processor is further configured to generate a second pixel block comprising second pixel values based on pixel shifting in the first pixel block of the plurality of first pixel blocks by a pre-determined count. The input image processor is further configured to determine a frequency value for the pixel-of-interest in the first pixel block based on a count of a pre-specified type of third pixel values in a corresponding third pixel block, wherein the third pixel values in the third pixel block are determined based on a pre-specified operation on the first pixel values of the first pixel block and the second pixel values of the second pixel block. The input image processor is further configured to estimate other plurality of frequency values for other pixels-of-interest in other plurality of first pixel blocks when a mode value, corresponding to a plurality of frequency values of pixels-of-interest in the plurality of first pixel blocks, exceeds a pre-determined threshold mode value. The input image processor is further configured to perform one or more image processing operations on the binary image based on the determined plurality of frequency values corresponding to the pixels-of-interest in the plurality of first pixel blocks and the estimated other plurality of frequency values corresponding to the other pixels-of-interest in the other plurality of first pixel blocks.

According to embodiment illustrated herein, there is provided a computer program product for use with a computer. The computer program product includes a non-transitory computer readable medium. The non-transitory computer readable medium stores a computer program code for processing binary images to classify halftone frequencies. The computer program code is executable by one or more image processors in a multifunction device to convert pixel values of a first pixel block, associated with a pixel-of-interest, into first pixel values, wherein the first pixel block is one of a plurality of first pixel blocks in a binary image. The computer program code is further executable by one or more image processors in a multifunction device to generate a second pixel block comprising second pixel values based on pixel shifting in the first pixel block of the plurality of first pixel blocks by a pre-determined count. The computer program code is further executable by one or more image processors in a multifunction device to determine a frequency value for the pixel-of-interest in the first pixel block based on a count of a pre-specified type of third pixel values in a corresponding third pixel block, wherein the third pixel values in the third pixel block are determined based on a pre-specified operation on the first pixel values of the first pixel block and the second pixel values of the second pixel block. The computer program code is further executable by one or more image processors in a multifunction device to estimate other plurality of frequency values for other pixels-of-interest in other plurality of first pixel blocks when a mode value, corresponding to a plurality of frequency values of pixels-of-interest in the plurality of first pixel blocks, exceeds a pre-determined threshold mode value. The computer program code is further executable by one or more image processors in a multifunction device to perform one or more image processing operations on the binary image based on the determined plurality of frequency values corresponding to the pixels-of-interest in the plurality of first pixel blocks and the estimated other plurality of frequency values corresponding to the other pixels-of-interest in the other plurality of first pixel blocks.

BRIEF DESCRIPTION OF DRAWINGS

The accompanying drawings illustrate various embodiments of systems, methods, and other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
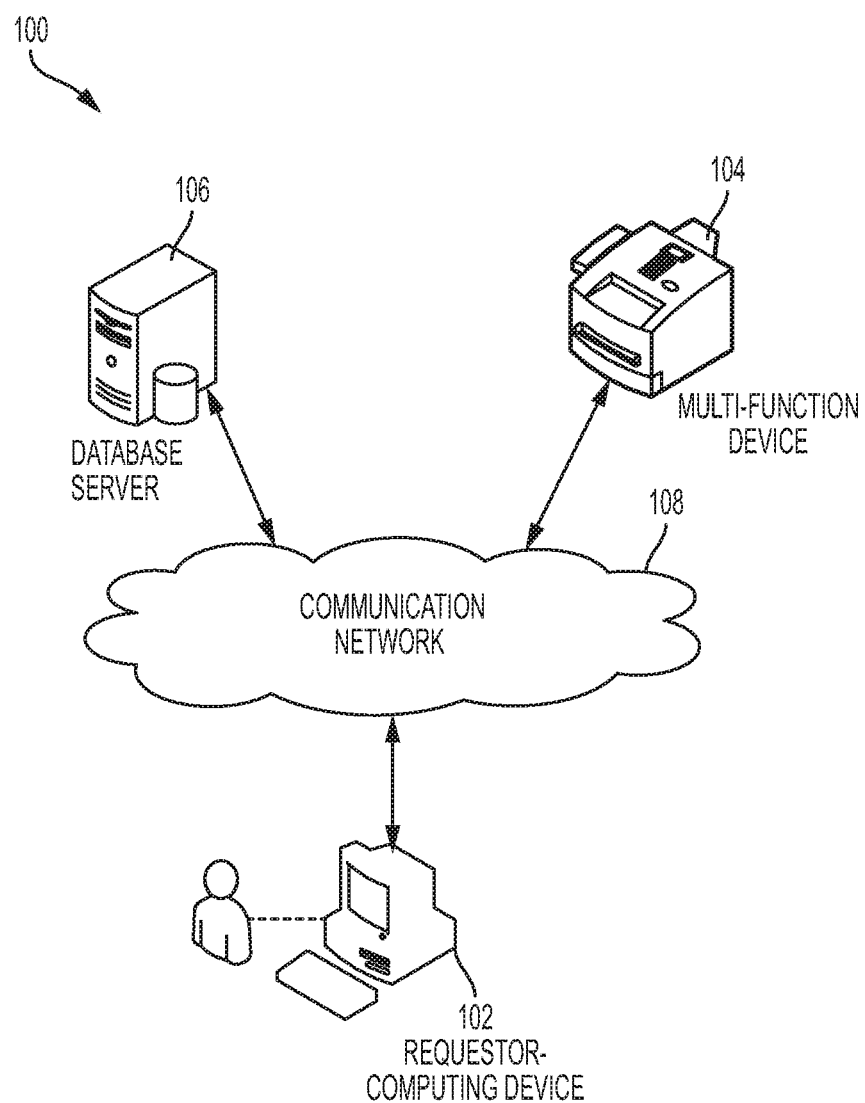
FIG. 1 is a block diagram that illustrates a system environment in which various embodiments of the system may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

An "input image" refers to a collection of pixels retained in an electronic form. The input image may be a contone image in which each pixel is associated with a continuous range of colors depending on the quantity of captured radiance. In an embodiment, the input image may be represented using one or more color schemes, such as, but not limited to, Cyan-Magenta-Yellow-Black (i.e., CMYK), Red-Green-Blue (i.e., RGB), Hue-Saturation-Value (i.e., HSV), YCbCr, Gray Scale, and/or the like. Further, the input image may be stored in a memory in various file formats, such as, JPG or JPEG, GIF, TIFF, PNG, BMP, RAW, PSD, PSP, PDF, and/or the like.

A "pixel" refers to the smallest element of image data that can be associated with a small area or spot in an input image that may be printed or displayed. In an embodiment, the pixel is represented by bits where the number of bits in the pixel is indicative of the information associated with the pixel.

A "pixel value" refers to a value associated with a pixel in an input image that indicates the brightness and/or color of the corresponding pixel. A collection of pixels, based on a pre-specified criterion, may correspond to a pixel block. The pixel block may comprise at least one pixel-of-interest. An input image may comprise a plurality of pixel blocks. For a grayscale image, the pixel value may be a single number representing the brightness of the pixel. For example, the pixel value, in accordance with a pixel format (such as the byte image), may correspond to an 8-bit integer representing a range of possible values from "0" to "255." Typically "0" corresponds to black color, and "255" corresponds to white color. Other values in between correspond to the different shades of gray. For a color image, in an RGB color space for example, separate red, green, and blue components may be specified for each pixel. Thus, in this example, the pixel value associated with a pixel is a vector of three numbers. The three different components may be stored as three separate "grayscale" images known as color planes (one each for red, green, and blue), that may be recombined when displaying or processing the color image.

A "binary image" refers to a digital image in which each pixel is stored as a single bit, such as "0" or "1." Typically, in a binary image, the color used for the object(s) in the input image is the foreground color, such as white, while the rest of the image is the background color, such as black. The binary image may be further referred to as a bitonal image.

A "first pixel value" refers to a binary pixel value of a pixel in a collection of pixels (or pixel block) in a binary image. The binary value may correspond to "0" or "1." Pixel values of a pixel block may be converted into first pixel values in a binary image based on binarization of the color input image with respect to a threshold value. The threshold value may be computed based on weighted difference between maximum and minimum pixel values of pre-determined neighbor pixels of a pixel-of-interest in a pixel block. The first pixel value may be stored in a "first pixel block."

A "second pixel value" refers to a binary pixel value of a pixel in a collection of pixels (or pixel block) in a binary image that is generated based on pixel shifting in the pixel block by a pre-determined count. The second pixel value may be stored in a "second pixel block."

A "third pixel value" refers to a binary pixel value of a pixel in a collection of pixels (or pixel block) in a binary image that is generated based on a logical operation, such as logical "OR" operation, on a first pixel value and a second pixel value. The third pixel value may be stored in a "third pixel block."

A "transition" refers to an instance when a change in first pixel values in a pixel block, such as the first pixel block, is observed. For example, a change in the first pixel values from "0" to "1" or "1" to "0" may correspond to the transition. In an embodiment, when a count of transitions of the first pixel values in the first pixel block exceeds a pre-determined value, the pixel shifting is performed in the first pixel block to generate the second pixel block. In an embodiment, when the count of transitions in the first pixel values in the first pixel block is less than the pre-determined value, the first pixel block may be invalidated.

"Pixel shifting" refers to shifting of pixels in one direction, such as right or left direction, by a count of pre-specified value in a pixel block and padding the pixel values, corresponding to the count of pre-specified value, in the opposite direction by "0s" or "1s." For example, the pixel values of pixels in a pixel block are "001101." A two right pixel shift will result in pixel values "110011," wherein two left bits are padded with "1s."

A "frequency tag" refers to a label assigned to a pixel-of-interest in a first pixel block and other pixels-of-interest in other plurality of first pixel blocks based on frequency values of the pixels-of-interest in the plurality of first pixel blocks and estimated other plurality of frequency values of other pixels-of-interest in other plurality of first pixel blocks. Based on the frequency tag, one or more image processing operations may be performed on the binary image. The one or more image processing operations correspond to de-screening and/or filtering operations.

A "mode value" refers to a frequency value with maximum instances in a set comprising a plurality of frequency values of pixels-of-interest in a plurality of first pixel blocks. When the mode value, corresponding to the plurality of frequency values of pixels-of-interest in the plurality of first pixel blocks, exceeds a pre-determined threshold mode value, other plurality of frequency values for other pixels-of-interest in other plurality of first pixel blocks may be estimated.

FIG. 1 is a block diagram that illustrates a system environment in which various embodiments may be implemented. With reference to FIG. 1, there is shown a system environment 100 that includes a requestor-computing device 102, an MFD 104, a database server 106, and a communication network 108. Various devices in the system environment 100 may be interconnected over the communication network 108. FIG. 1 shows, for simplicity, one requestor-computing device, such as the requestor-computing device 102, one MFD, such as the MFD 104, and one database server, such as the database server 106. However, it will be apparent to a person having ordinary skill in the art that the disclosed embodiments may also be implemented using multiple requestor-computing devices, multiple MFDs, and multiple database servers without departing from the scope of the disclosure.

The requestor-computing device 102 refers to a computing device that may be utilized by one or more requestors associated with an entity (e.g., an organization, or an institution) to perform one or more printing operations. The one or more requestors associated with the entity may correspond to one or more of an employee, an employer, a student, and/or the like. Further, the requestor-computing device 102 may comprise one or more processors in communication with one or more memory units. The one or more memory units may include one or more computer readable codes, instructions, programs, or algorithms that are executable by the one or more processors to generate the one or more printing instructions. In an embodiment, the requestor may utilize the requestor-computing device 102 to communicate with the MFD 104 or the database server 106 over the communication network 108 (e.g., using wired or wireless communication capabilities). Based on the communication, the requestor may utilize the requestor-computing device 102 to transmit one or more requests pertaining to the one or more printing operations to the MFD 104. The requestor may further transmit one or more images, associated with the one or more printing operations, to the MFD 104 over the communication network 108. The requestor may further utilize the requestor-computing device 102 to retrieve the one or more images from the database server 106 over the communication network 108. Examples of the requestor-computing device 102 may include, but are not limited to, a desktop computer, a laptop, a personal digital assistant (PDA), a mobile device, a smartphone, a tablet computer (e.g., iPad® and Samsung Galaxy Tab®), and/or the like.

The MFD 104 is an electronic device that may handle image data for a given purpose and may include stand-alone printing or display devices, and is configured to perform one or more associated operations. The one or more associated operations may include one or more of, but are not limited to, scanning, copying, printing, e-mailing, faxing, and/or the like. The MFD 104 may comprise one or more processors, in communication with one or more memory units. The one or more memory units may include one or more computer readable codes, instructions, programs, or algorithms that are executable by the one or more processors to perform the one or more associated operations.

In an embodiment, the MFD 104 may be configured to receive the request from the requestor-computing device 102, over the communication network 108, to process the input image. The request may include the input image (i.e., a soft-copy of the input image) and information about one or more operations (e.g., print, scan, fax, and/or the like) that are required to be performed on the input image. In an embodiment, the requestor may utilize the MFD 104 to submit a request and a hard-copy of an input image. In such a case, the requestor may utilize the MFD 104 to scan the hard-copy of the input image and thereafter, provide information about one or more operations that are required to be performed on the scanned input image.

In an embodiment, the MFD 104 may be configured to convert the received input image to the binary image. The MFD 104 may be configured to convert the pixel values of the pixel block (of the input image) into the first pixel values of the first pixel block (of the binary image), based on a threshold value. In an embodiment, the MFD 104 may be configured to compute the threshold value for each pixel-of-interest, based on a weighted difference between maximum and minimum pixel values of the pre-determined neighbor pixels of the pixel-of-interest.

In an embodiment, the MFD 104 may determine the count of transitions in the first pixel values of the first pixel block. The count of transitions may be determined based on changes in the first pixel values in the first pixel block. The changes may correspond to changing of first pixel values from "0" to "1" or from "1" to "0." The MFD 104 may further determine whether the count of transitions of the first pixel values in the first pixel block, exceeds the pre-determined value. In an instance, when the count of transitions of the first pixel values in the first pixel block is less than or equal to the pre-determined value, the MFD 104 may invalidate the first pixel block. In an instance, when the count of transitions of the first pixel values in the first pixel block exceeds the pre-determined value, the MFD 104 may generate a second pixel block comprising second pixel values, based on pixel shifting in the first pixel block.

In an embodiment, the MFD 104 may be configured to determine a third pixel block, including the third pixel values, based on the pre-specified operation, such as logical "OR" operation, on the first pixel values of the first pixel block and the second pixel values of the second pixel block. In an embodiment, the MFD 104 may be configured to determine a frequency value for the pixel-of-interest in the first pixel block based on a count of a pre-specified type of third pixel values in the corresponding third pixel block. Consequently, the MFD 104 may determine the frequency value of the first pixel block, in entirety. Once the frequency value is determined for the first pixel block, same steps may be repeated to determine the frequency values for next pixel blocks.

In an embodiment, the MFD 104 may execute the above steps for each pixel in a pre-determined count of lines of the binary image to determine the corresponding frequency values. Further, the MFD 104 may execute the above steps for each pixel in a pre-determined count of lines and a column of the binary image to determine the corresponding frequency values. In an embodiment, the MFD 104 may be configured to determine the mode value corresponding to the plurality of frequency values of the pixels-of-interest in the plurality of first pixel blocks. In an instance, when the mode value is less than the pre-determined threshold mode value, the current pixel-of-interest is determined at next location. In an embodiment, when the mode value exceeds the pre-determined threshold mode value, other plurality of frequency values for other pixels-of-interest in other plurality of first pixel blocks may be estimated.

In an embodiment, the MFD 104 may be configured to classify the estimated other plurality of frequency values, corresponding to the other pixels-of-interest, in the pre-defined set of categories. In an embodiment the MFD 104 may be configured to assign the one or more frequency tags based on the determined plurality of frequency values of the pixels-of-interest in the plurality of first pixel blocks and the estimated other plurality of frequency values of the other pixels-of-interest in the other plurality of first pixel blocks. In an embodiment, a single frequency tag may be determined for the full binary image. In another embodiment, different frequency tags may be determined for different portions of the binary image. In an embodiment, the MFD 104 may be configured to perform one or more image processing operations on the binary image. The one or more image processing operations may be performed, based on the assigned frequency tags. Examples of the one or more image processing operations may include, but are not limited to, de-screening and/or filtering operations.

Figure 2:
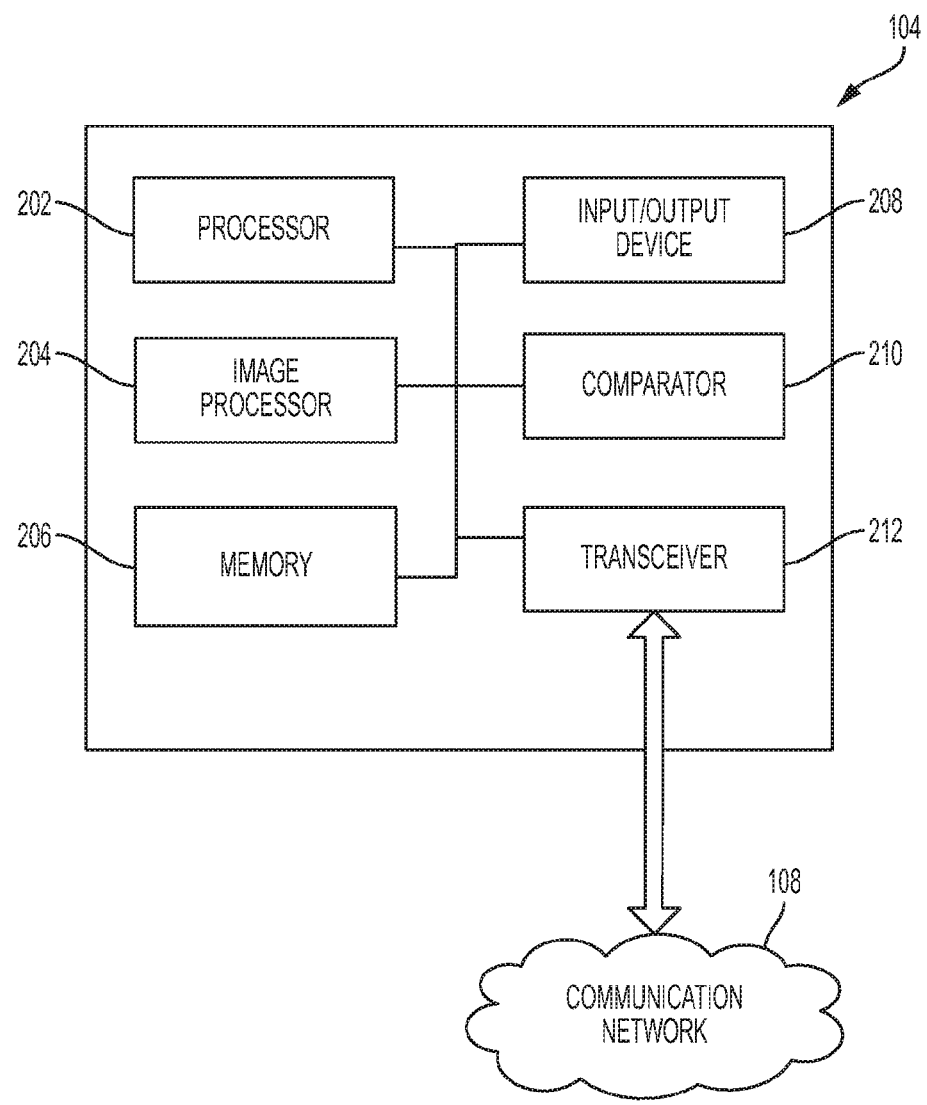
FIG. 2 is a block diagram that illustrates various components of a MFD, in accordance with at least one embodiment.
Figure 3A:
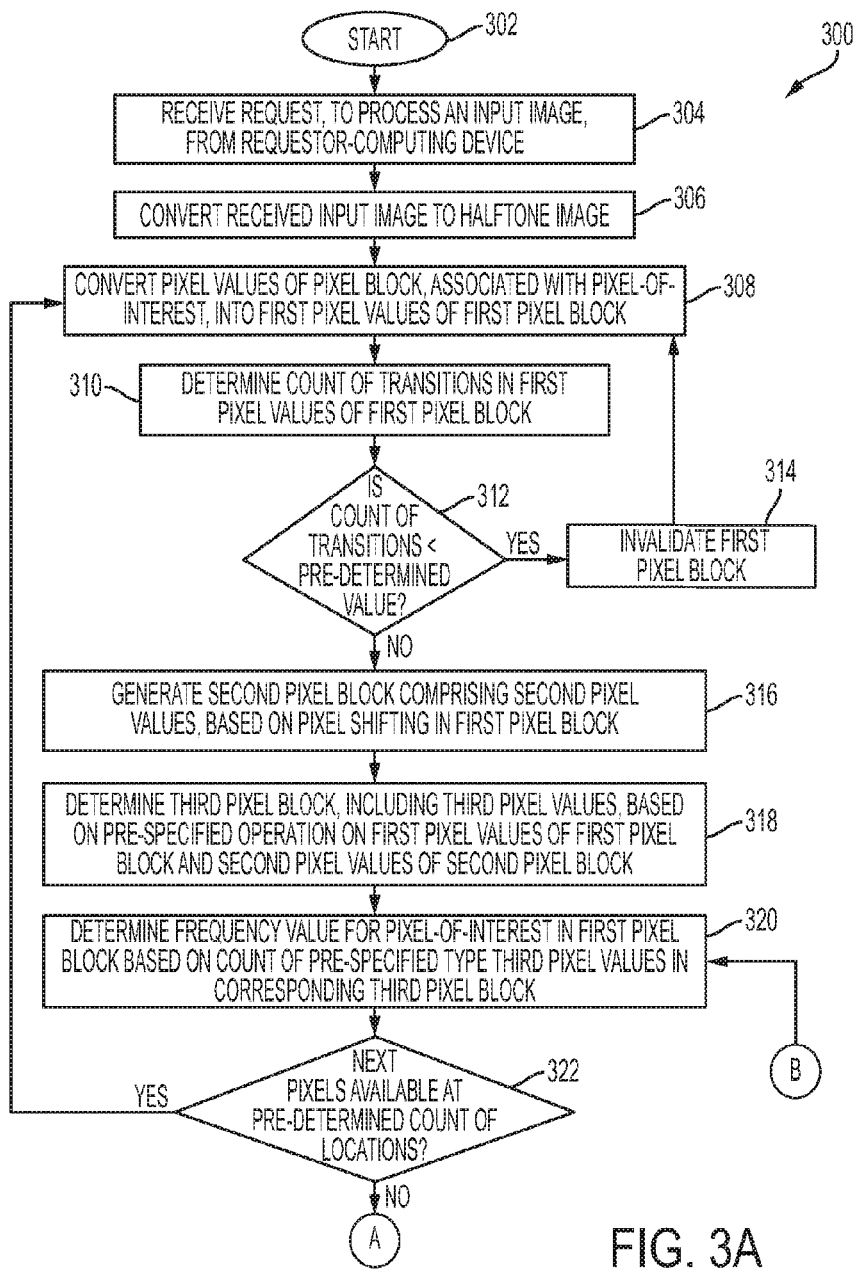
FIGS. 3A and 3B, collectively, depict a flowchart that illustrates an image processing method for classification of halftone frequencies, in accordance with at least one embodiment.
Figure 3B:
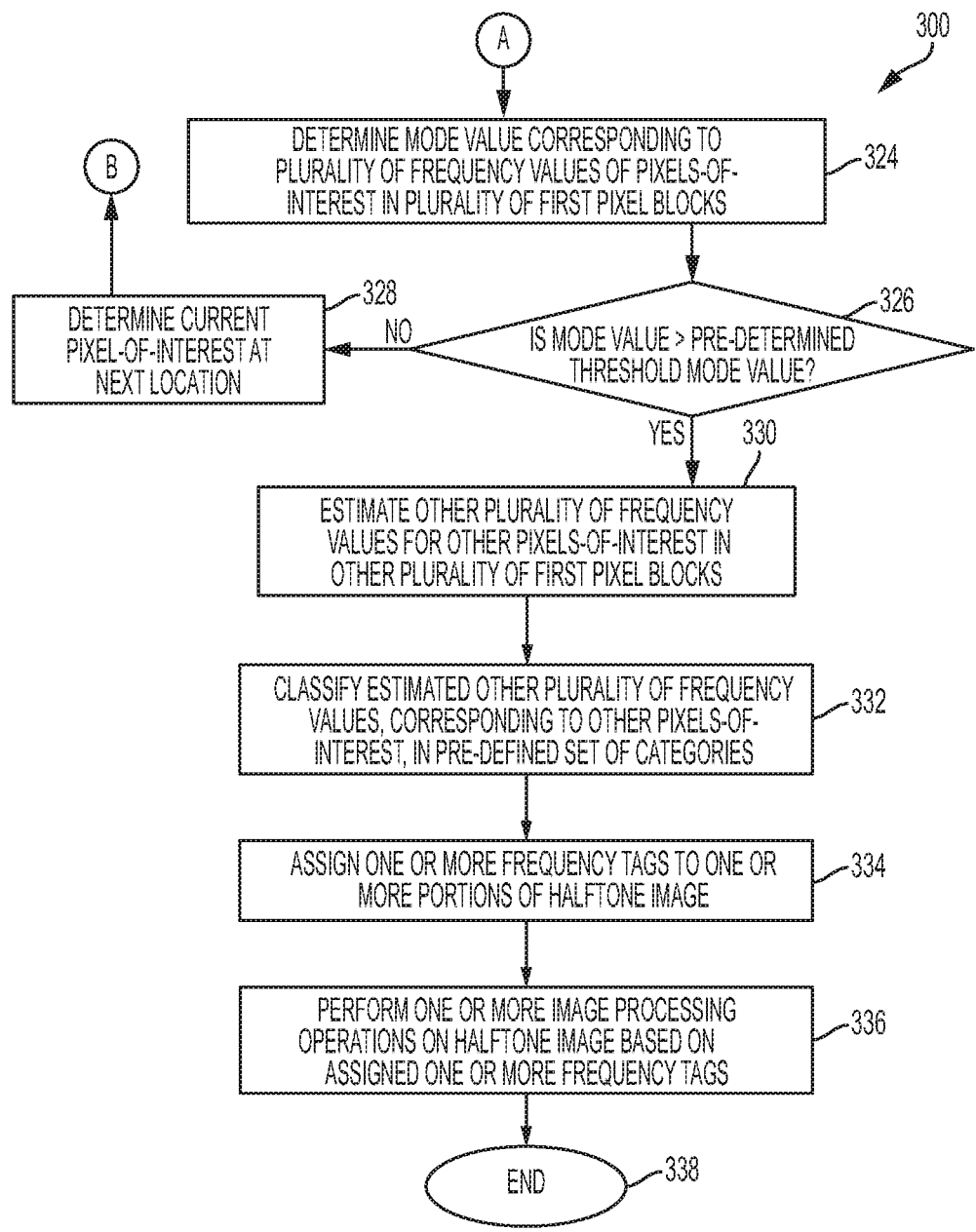

The MFD 104 has been explained in detail in conjunction with FIG. 2 and FIG. 3. Examples of the MFD 104 may include, but are not limited to, one or more types of a multi-function printer, such as an all-in-one multi-function printer, a small office/home office (SOHO) multi-function printer, an office multi-function printer, a production printing multi-function printer, and/or the like.

A person having ordinary skill in the art will understand that the scope of the disclosure is not limited to the MFD 104 as the electronic device with multiple functionalities, such as scanning, copying, printing, e-mailing, faxing, and/or the like. The MFD 104 may perform additional functionalities, such as image processing, without deviating from the scope of the disclosure.

The database server 106 refers to a computer or a storage device that may be configured to store the one or more requests and the associated one or more images (or the one or more scanned-images) received from the requestor-computing device 102 or the MFD 104, in accordance with at least one embodiment. In an embodiment, the database server 106 may further be configured to store the one or more binary images. In an embodiment, the database server 106 may receive the one or more binary images from the MFD 104 over the communication network 108. Further, in an embodiment, the database server 106 may include a separate buffer to store each of the one or more binary images.

In an embodiment, the database server 106 may store the received request and the received scanned input image in the memory 206 or the database server 106. The database server 106 may further store various screening, de-screening, and/or filtering algorithms required by the MFD 104. Further, in an embodiment, the database server 106 may store one or more sets of instructions, codes, scripts, or programs that may be retrieved by the MFD 104 to perform the one or more associated operations. For querying the database server 106, one or more querying languages may be utilized. Examples of the one or more query languages may include, but are not limited to, Structured Query Language (SQL), QUEry Language (QUEL), and Data Mining Extensions (DMX). Further, the database server 106 may be realized through various technologies such as, but not limited to, Microsoft® SQL server, Oracle, and My SQL. In an embodiment, the requestor-computing device 102 or the MFD 104 may connect to the database server 106 using one or more protocols, such as, but not limited to, Open Data Base Connectivity (ODBC) protocol and Java Data Base Connectivity (JDBC) protocol.

The communication network 108 may include a medium through which devices, such as the requestor-computing device 102, the MFD 104, and the database server 106, may communicate with each other. Examples of the communication network 108 may include, but are not limited to, the Internet, a cloud network, a Wireless Fidelity (Wi-Fi) network, a wireless local area network (WLAN), a wireless wide area network (WWAN), a wireless personal area network (WPAN), a local area network (LAN), a plain old telephone service (POTS), and/or a metropolitan area network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols, or Bluetooth (BT) communication protocols.

FIG. 2 is a block diagram that illustrates various components of a MFD, in accordance with at least one embodiment. FIG. 2 is explained in conjunction with the FIG. 1. With reference to FIG. 2, there is shown the MFD 104 that may include one or more processors, such as a processor 202, one or more image processors, such as an image processor 204, one or more memory units, such as a memory 206, one or more input/output (I/O) units, such as an I/O unit 208, a comparator 210, and one or more transceivers, such as a transceiver 212. A person having ordinary skill in the art will appreciate that the scope of the disclosure is not limited to the components as described herein. The MFD 104 may include one or more other components without limiting the scope of the disclosure.

The processor 202 may comprise suitable logic, circuitry, interface, and/or code that may be configured to execute one or more sets of instructions, codes, scripts, or programs stored in the memory 206. The processor 202 may be communicatively coupled to the image processor 204, the memory 206, the I/O unit 208, the comparator 210, and the transceiver 212. The processor 202 in coordination with the image processor 204, the memory 206, the I/O unit 208, the comparator 210, and the transceiver 212 may be configured to execute the one or more sets of instructions, programs, codes, and/or scripts stored in the memory 206 to perform the one or more associated operations.

In an embodiment, the processor 202, in conjunction with the transceiver 212, may be configured to receive a request and a scanned input image from the requestor-computing device 102, over the communication network 108, to process the input image. The processor 202 may store the received request and the received scanned input image in the memory 206 or the database server 106. In an embodiment, the processor 202 may communicate the received scanned input image to the image processor 204. The processor 202 may be implemented based on a number of processor technologies known in the art. Examples of the processor 202 include, but are not limited to, an X86-based processor, a Reduced Instruction Set Computing (RISC) processor, an ASIC processor, a Complex Instruction Set Computing (CISC) processor, a microprocessor, a microcontroller, and/or the like.

The image processor 204 may comprise suitable logic, circuitry, interface, and/or code that may be configured to execute one or more sets of instructions, codes, scripts, or programs stored in the memory 206. The image processor 204 may be communicatively coupled to the processor 202, the memory 206, the I/O unit 208, the comparator 210, and the transceiver 212. The image processor 204 may execute the one or more sets of instructions, programs, codes, and/or scripts stored in the memory 206 to perform the one or more associated operations. The image processor 204 may be communicatively coupled with one or more specialized units, such as a conversion unit, a pixel shifting unit, a frequency determination unit, and a frequency estimation unit, that may perform corresponding specialized operations. The one or more specialized units may be implemented as separate processors or circuitries in the MFD 104. The image processor 204 and the one or more specialized units may be implemented as an integrated processor or a cluster of processors that perform the functions of the image processor 204 and the one or more specialized units. The image processor 204 may be implemented as a set of instructions stored in the memory 206 and/or one or more specialized units, which on execution by the processor 202 may perform the functions of the MFD 104.

In an embodiment, the image processor 204 may be configured to convert the received input image to the binary image. In an embodiment, the image processor 204 may be configured to convert the pixel values of the pixel block (of the received input image) into the first pixel values of the first pixel block (of the binary image), based on a threshold value. In an embodiment, the image processor 204 may be configured to compute the threshold value for each pixel-of-interest, based on a weighted difference between maximum and minimum pixel values of the pre-determined neighbor pixels of the pixel-of-interest. In an embodiment, the image processor 204 may determine the count of transitions in the first pixel values of the first pixel block. The count of transitions may be determined based on changes in the first pixel values in the first pixel block. The changes may correspond to changing of first pixel values from "0" to "1" or from "1" to "0."

In an embodiment, the image processor 204, in conjunction with the comparator 210, may determine whether the count of transitions of the first pixel values in the first pixel block, exceeds the pre-determined value. In an instance, when the count of transitions of the first pixel values in the first pixel block is less than or equal to the pre-determined value, the image processor 204 may invalidate the first pixel block. In an instance, when the count of transitions of the first pixel values in the first pixel block exceeds the pre-determined value, the image processor 204 may generate a second pixel block comprising second pixel values, based on pixel shifting in the first pixel block.

In an embodiment, the image processor 204 may be configured to determine a third pixel block, including the third pixel values, based on the pre-specified operation, such as logical "OR" operation, on the first pixel values of the first pixel block and the second pixel values of the second pixel block. In an embodiment, the image processor 204 may be configured to determine a frequency value for the pixel-of-interest in the first pixel block based on a count of a pre-specified type of third pixel values in a corresponding third pixel block. Consequently, the image processor 204 may determine the frequency value of the first pixel block, in entirety. Once the frequency value is determined for the first pixel block, same steps are repeated to determine the frequency values for next pixel blocks. In an embodiment, the image processor 204 may execute the above steps for each pixel in a pre-determined count of lines of the binary image to determine the corresponding frequency values. Further, the image processor 204 may execute the above steps for each pixel in a pre-determined count of lines and a column of the binary image to determine the corresponding frequency values.

In an embodiment, the image processor 204 may be configured to determine the mode value corresponding to the plurality of frequency values of the pixels-of-interest in the plurality of first pixel blocks. The image processor 204, in conjunction with the comparator 210, may further determine whether the mode value is less than the pre-determined threshold mode value. In an instance, when the mode value is less than the pre-determined threshold mode value, the current pixel-of-interest is determined at next location. In an instance, when the mode value exceeds the pre-determined threshold mode value, other plurality of frequency values for other pixels-of-interest in other plurality of first pixel blocks may be estimated.

In an embodiment, the image processor 204 may be configured to classify the estimated other plurality of frequency values, corresponding to the other pixels-of-interest, in the pre-defined set of categories. In an embodiment, the image processor 204 may be configured to assign the one or more frequency tags based on the determined plurality of frequency values of the pixels-of-interest in the plurality of first pixel blocks and the estimated other plurality of frequency values of the other pixels-of-interest in the other plurality of first pixel blocks. In an embodiment, a single frequency tag may be determined for the full binary image. In another embodiment, different frequency tags may be determined for different portions of the binary image. In an embodiment, the image processor 204 may be configured to perform one or more image processing operations on the binary image. The one or more image processing operations may be performed, based on the determined one or more frequency tags. Examples of the one or more image processing operations may include, but are not limited to, de-screening and/or filtering operations.

Figure 4:
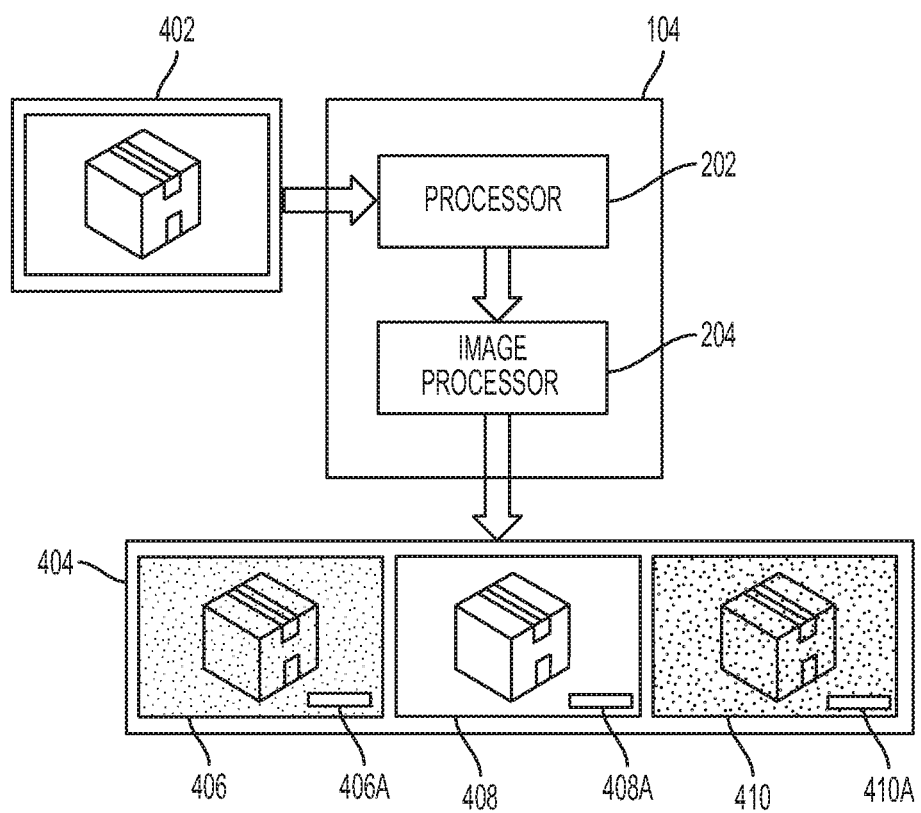
FIG. 4 depicts an exemplary scenario of an image processing method for classification of halftone frequencies, in accordance with at least one embodiment.

The functionalities of the image processor 204 have been explained in detail in conjunction with FIG. 3 and FIG. 4. The image processor 204 may be implemented as a separate processor or circuitry in the MFD 104. The image processor 204 and the processor 202 may be implemented as an integrated processor or a cluster of processors that perform the functions of the image processor 204 and the processor 202. The image processor 204 may be implemented as a set of instructions stored in the memory 206, which on execution by the processor 202 may perform the functions of the MFD 104.

The memory 206 may comprise suitable logic, circuitry, interface, and/or code that may be configured to store one or more machine codes, and/or computer programs having at least one code section executable by the processor 202 and/or the image processor 204. The memory 206 may be further configured to store the one or more sets of instructions, codes, and/or scripts. In an embodiment, the memory 206 may be configured to store the input image that may be received from the requestor-computing device 102. Further, the memory 206 may be configured to temporarily store the one or more received images, one or more binary images, and/or frequency tags assigned to the one or more portions of the one or more binary images. The memory 206 may further store various screening, de-screening, and/or filtering algorithms required by the image processor 204. Examples of the commonly known memory implementations may include, but are not limited to, a random access memory (RAM), a read only memory (ROM), a hard disk drive (HDD), and a secure digital (SD) card. It will be apparent to a person having ordinary skill in the art that the one or more sets of instructions, programs, codes, and/or scripts stored in the memory 206 may enable the hardware of the MFD 104 to perform the one or more associated operations.

The I/O unit 208 may comprise suitable logic, circuitry, interface, and/or code that may be operable to receive the one or more requests from the requestor-computing device 102 through the transceiver 212 over the communication network 108. Further, the I/O unit 208 may be configured to transmit one or more responses, pertaining to the one or more requests, to the requestor-computing device 102 over the communication network 108. The I/O unit 208 may be operable to communicate with the processor 202, the image processor 204, the memory 206, the comparator 210, and the transceiver 212. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The comparator 210 is configured to compare at least two input signals to generate an output signal. In an embodiment, the output signal may correspond to either "1" or "0." In an embodiment, the comparator 210 may generate output "1" if the value of a first signal (from the at least two signals) is greater than a value of the second signal (from the at least two signals). Similarly, the comparator 210 may generate an output "0" if the value of the first signal is less than the value of the second signal. The comparator 210, in conjunction with the image processor 204 and/or one or more specialized units, may be configured to perform one or more comparisons, as described in FIG. 3. In an embodiment, the comparator 214 may be realized through either software technologies or hardware technologies known in the art.

The transceiver 212 may comprise suitable logic, circuitry, interface, and/or code that may be configured to communicate with one or more computing devices, such as the requestor-computing device 102, one or more MFDs, such as the MFD 104, and one or more database servers, such as the database server 106, over the communication network 108. The transceiver 212, in conjunction with the I/O unit 208, may be configured to transmit or receive the one or more sets of instructions, queries, and/or other information to/from various components of the system environment 100.

The transceiver 212 may implement one or more known technologies to support wired or wireless communication with the communication network 108. In an embodiment, the transceiver 212 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a WLAN and/or a MAN. The wireless communication may use any of a plurality of communication standards, protocols, and technologies, such as: Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (Wi-Fi) (e.g., IEEE 802.11a, IEEE 802.11b, IEEE 802.11g and/or IEEE 802.11n), Voice over Internet Protocol (VoIP), Wi-MAX, and a protocol for email, instant messaging, and/or Short Message Service (SMS).

FIG. 3 is a flowchart that illustrates an image processing method for classification of halftone frequencies, in accordance with at least one embodiment. With reference to FIG. 3, there is shown a flowchart 300 described in conjunction with FIG. 1 and FIG. 2. The flowchart 300 starts at step 302 and proceeds to step 304.

At step 304, a request to process an input image is received from the requestor-computing device 102. In an embodiment, the processor 202, in conjunction with the transceiver 212, may be configured to receive the request from the requestor-computing device 102, over the communication network 108, to process the input image. In an embodiment, the requestor may utilize the requestor-computing device 102 to transmit the request to the MFD 104 over the communication network 108. The request may include the input image (i.e., a soft-copy of the input image)

and information about one or more operations (e.g., print, scan, fax, and/or the like) that are required to be performed on the input image. In an embodiment, the received input image may include one or more image planes, based on one or more color schemes. Examples of the one or more color schemes may include, but are not limited to, CMYK, RGB, HSV, YCbCr, and/or Gray Scale. Further, each of the one or more image planes may be associated with a predefined angle (i.e., a screen angle). For example, a screen angle of a cyan input image plane, a magenta image plane, a yellow image plane, and a black image plane in CMYK color plane may correspond to "15 degree," "75 degree," "0 degree," and "45 degree," respectively. The screen angle of each of the one or more image planes is defined with respect to a reference plane of an input image frame, such as a vertical plane, associated with the input image.

In certain scenarios, the requestor may utilize the MFD 104 to submit a request and a hard-copy of an input image. In such a case, the requestor may utilize the MFD 104 to scan the hard-copy of the input image and thereafter, provide information about the one or more operations that are required to be performed on the scanned input image. After receiving the request and the scanned input image, the processor 202 in conjunction with the transceiver 212, may store the received request and the received scanned input image in the memory 206 or the database server 106.

At step 306, pixel blocks are determined in the received input image. In an embodiment, the image processor 204 may be configured to determine pixel blocks in the received input image. In an embodiment, the input image may include a plurality of pixels with corresponding pixel values. From the plurality of pixels, one pixel may correspond to pixel-of-interest and rest of the pixels may correspond to neighbor pixels. In an embodiment, the count of neighbor pixels may be pre-determined, based on one or more factors, such as processing capability of the image processor 204. In an embodiment, the neighbor pixels may be equally distributed with respect to the pixel-of-interest in a pixel block. For example, a pixel block "B" in the input image may comprise a sequence of "33" pixels, "P0" to "P32." The pixel "P16" that is the pixel-of-interest, may be located at the center of the pixel block "B." Out of the remaining "32" neighbor pixels, "16" pixels, i.e., "P0" to "P15," may be towards the left side and rest "16" pixels, i.e., "P17" to "P32," may be towards the right side of the pixel-of-interest, "P16," as shown in pixel block "B" below:

| Pixel block "B" | | | | | | | | | | | | | | |
|---|---|---|---|---|---|---|---|---|---|---|---|---|---|---|
| 10 | 9 | 80 | 85 | 5 | 85 | ... | 89 | ... | 8 | 8 | 85 | 5 | 90 | 5 |
| $P_0$ | $P_1$ | $P_2$ | $P_3$ | $P_4$ | $P_5$ | ... | $P_{16}$ | ... | $P_{27}$ | $P_{28}$ | $P_{29}$ | $P_{30}$ | $P_{31}$ | $P_{32}$ |

Further, as shown above in the pixel block "B," each pixel may be associated with a corresponding pixel value. For example, the pixel value of pixel "P0" may be "10" and pixel value of the pixel "P31" may be "90." A person having ordinary skill in the art will understand that the abovementioned example is for illustrative purpose and should not be construed to limit the scope of the disclosure.

At step 308, the received input image, comprising the plurality of pixel blocks, may be converted into a binary image, comprising a plurality of first pixel blocks. In an embodiment, the image processor 204 may be configured to convert the received input image, comprising the plurality of pixel blocks, into a binary image, comprising a plurality of first pixel blocks. More specifically, the image processor 204 may be configured to convert the pixel values of each pixel block, associated with the pixel-of-interest, into first pixel values of a corresponding first pixel block. The first pixel block may be one of the plurality of first pixel blocks in the binary image. In an embodiment, the image processor 204 may be configured to convert the pixel values of the pixel block into the first pixel values of the first pixel block, based on a threshold value. In an embodiment, the image processor 204 may be configured to compute the threshold value for each pixel-of-interest, based on a weighted difference between maximum and minimum pixel values of the pre-determined neighbor pixels of the pixel-of-interest. For example, the image processor 204 may be configured to convert pixel values of the pixel block "B," as shown above, into first pixel values of a first pixel block "B1," as shown below:

| First pixel block "$B_1$" | | | | | | | | | | | | | | |
|---|---|---|---|---|---|---|---|---|---|---|---|---|---|---|
| 0 | 0 | 1 | 1 | 0 | 1 | ... | 1 | ... | 0 | 0 | 1 | 0 | 1 | 0 |
| $P_0$ | $P_1$ | $P_2$ | $P_3$ | $P_4$ | $P_5$ | ... | $P_{16}$ | ... | $P_{27}$ | $P_{28}$ | $P_{29}$ | $P_{30}$ | $P_{31}$ | $P_{32}$ |

In accordance with the above example, with reference to the pixel block "B," the pixel values "10" and "90" of pixels "P0" and "P31," respectively, may be the minimum and maximum pixel values, respectively, in the pixel block "B." The image processor 204 may compute the difference of the maximum and minimum pixel values to be "80." The image processor 204 may further compute the weighted pixel value of each pixel, based on a pre-specified weight factor determined based on the weighted difference of the maximum and minimum pixel values. Accordingly, the image processor 204 in conjunction with the comparator 210, may determine the first pixel values for the first pixel block "B1" based on a comparison of the weighted pixel values with a local threshold value. For example, the first pixel values of pixels "P0" and "P31" may be "0" and "1," respectively. Similarly, the first pixel values of each of first pixel block "B1" may be determined, as shown above. Thus, the image processor 203 converts the received input image into the binary image. A person having ordinary skill in the art will understand that the abovementioned example is for illustrative purpose and should not be construed to limit the scope of the disclosure.

At step 310, a count of transitions in the first pixel values of the first pixel block in the binary image may be determined. In an embodiment, the image processor 204 may determine the count of transitions in the first pixel values of the first pixel block in the binary image. The count of transitions may be determined based on changes in the first pixel values in the first pixel block in the binary image. The changes may correspond to changing of first pixel values from "0" to "1" or from "1" to "0." For example, the image processor 204 may determine the count of transitions in the first pixel values of the first pixel block "B1" to be "8," as the first pixel values exhibit a count of eight changes from "0" to "1" and from "1" to "0."

In an embodiment, for a high frequency block (or region), the count of transitions from "0" to "1" or from "1" to "0" exceeds a threshold value. In an embodiment, for a low frequency block (or region), the count of transitions from "0" to "1" or from "1" to "0" is less than the threshold value. The count of zero transitions may imply that the plurality of pixels in a pixel block exhibits constant first pixel values, i.e., either all "0s" or all "1s."

At step 312, it may be determined whether the count of transitions of the first pixel values in the first pixel block of the binary image exceeds a pre-determined value. In an embodiment, the image processor 204 in conjunction with the comparator 210, may determine whether the count of transitions of the first pixel values in the first pixel block, exceeds the pre-determined value. In an embodiment, the pre-determined value may be "0." In an embodiment, when the count of transitions of the first pixel values in the first pixel block exceeds the pre-determined value, control passes to step 316. In an embodiment, when the count of transitions of the first pixel values in the first pixel block is less than or equal to the pre-determined value, control passes to step 314.

At step 314, when the count of transitions of the first pixel values in the first pixel block is less than or equal to the pre-determined value, the first pixel block in the binary image may be invalidated. In an embodiment, the image processor 204 may invalidate the first pixel block when the count of transitions of the first pixel values in the first pixel block is less than or equal to the pre-determined value. For example, when the first pixel values of all "33" pixels in the first pixel block "B1" is "0s" or "1s," the image processor 204 may invalidate the first pixel block "B1." In such a case, the image processor 204 may determine the next pixel, "P17," as the next pixel-of-interest, the next first block "B1," and new neighbor pixels "P1" to "P16" and "P18" to "P33" on either sides of the next pixel-of-interest, "P17." In such a case, the control passes back to step 308 for the next pixel block. The loop may be repeated till a first pixel block with non-zero transitions is determined.

At step 316, when the count of transitions of the first pixel values in the first pixel block of the binary image exceeds the pre-determined value, a second pixel block, comprising second pixel values, may be generated. In an embodiment, the image processor 204 may generate the second pixel block comprising second pixel values, based on pixel shifting in the first pixel block. For example, the image processor 204 may generate the second pixel block "B2," based on pixel shifting in the first pixel block "B1," by a pre-determined count, such as "4," as shown below:

| Second pixel block "B$_2$" | | | | | | | | | | | | | | |
|---|---|---|---|---|---|---|---|---|---|---|---|---|---|---|
| 1 | 1 | 1 | 1 | 0 | 0 | ... | 0 | ... | 1 | 0 | 0 | 0 | 1 | 0 |
| P$_0$ | P$_1$ | P$_2$ | P$_3$ | P$_4$ | P$_5$ | ... | P$_{16}$ | ... | P$_{27}$ | P$_{28}$ | P$_{29}$ | P$_{30}$ | P$_{31}$ | P$_{32}$ |

In accordance with the above example, the image processor 204 may perform right pixel shifting by "4 bits" in the first pixel block "B1," to generate the second pixel block "B2." Consequently, the pixel values of the leftmost four pixels, "P0" to "P3," are padded with bit values "1." A person having ordinary skill in the art will understand that the abovementioned example is for illustrative purpose and should not be construed to limit the scope of the disclosure.

At step 318, a third pixel block including third pixel values in the binary image may be determined. The third pixel values in the third pixel block may be determined, based on a pre-specified operation on the first pixel values of the first pixel block and the second pixel values of the second pixel block. In an embodiment, the image processor 204 may be configured to determine the third pixel block, including the third pixel values, based on the pre-specified operation on the first pixel values of the first pixel block and the second pixel values of the second pixel block. For example, the image processor 204 may be configured to determine the third pixel block "B3," including the third pixel values, based on the pre-specified operation, such as logical "OR" operation, on the first pixel values of the first pixel block "B1" and the second pixel values of the second pixel block "B2," as shown below:

| Third pixel block "B$_3$" | | | | | | | | | | | | | | |
|---|---|---|---|---|---|---|---|---|---|---|---|---|---|---|
| 0 | 0 | 1 | 1 | 0 | 0 | ... | 0 | ... | 0 | 0 | 0 | 0 | 1 | 0 |
| P$_0$ | P$_1$ | P$_2$ | P$_3$ | P$_4$ | P$_5$ | ... | P$_{16}$ | ... | P$_{27}$ | P$_{28}$ | P$_{29}$ | P$_{30}$ | P$_{31}$ | P$_{32}$ |

In accordance with the above example, the first pixel value of the pixel "P0" is "0" in the first pixel block "B1," and the second pixel value of the pixel "P0" is "1" in the second pixel block "B2." Based on the logical "OR" operation, the third pixel value of the pixel "P0" may be determined to be "0" in the third pixel block "B3." Similar operation is performed by the image processor 204 on the remaining first and second pixel values of the pixels, "P1" to "P32," in the first pixel block "B1" and the second pixel block "B2," respectively, to determine the third pixel values of the pixels, "P1" to "P32," in the third pixel block "B3." A person having ordinary skill in the art will understand that the abovementioned example is for illustrative purpose and should not be construed to limit the scope of the disclosure.

At step 320, a frequency value for the pixel-of-interest in the first pixel block, consequently the first pixel block, may be determined based on a count of a pre-specified type of third pixel values in a corresponding third pixel block. In an embodiment, the image processor 204 may be configured to determine a frequency value for the pixel-of-interest in the first pixel block based on a count of a pre-specified type of third pixel values in a corresponding third pixel block. For example, the image processor 204 may determine the frequency value, such as "F," for the pixel-of-interest, "P16," in the first pixel block "B1" based on the count of a pre-specified type of third pixel values, such as "0s," in the corresponding third pixel block "B3." Consequently, the image processor 204 may determine the frequency value, such as "F," of the first pixel block "B1," in entirety. Once the frequency value, such as "F," is determined for the first pixel block "B1," the same steps are repeated to determine the frequency value for next pixel blocks, which start from pixel "P34" (not shown).

In an embodiment, the frequency value "F" of the first pixel block "B1" may correspond to one of the pre-defined set of categories. In an instance, when the count of "0s" in the third pixel block "B3" is in the range of "0" and "6," the frequency value "F" of the first pixel block "B1" may be determined to be "less than or equal to 100 LPI," which is "Low Frequency" category. In another instance, when the count of "0s" in the third pixel block "B3" is in the range of "7" and "10," the frequency value "F" of the first pixel block "B1" may be determined to be "within 101 to 149 LPI," which is "Mid Frequency" category. In yet another instance, when the count of "0s" in the third pixel block "B3" is above "10," the frequency value "F" of the first pixel block "B1" may be determined to be "greater than or equal to 150 LPI," which is "High Frequency" category. It may be noted that the pixel shift and logical "OR" operation, as described in steps 316 and 318, respectively, may convert more "0s" to "1s" in the high frequency block (or region) while less "0s" to "1s" in the low frequency block (or region).

In an embodiment, the above steps 308 to 320 may be executed for each pixel in a pre-determined count of lines and columns of the binary image to determine the corresponding frequency values, as shown in the "Frequency Matrix of Binary image" below:

Frequency matrix of binary image

|       | $C_1$ | $C_2$ | $C_3$ | $C_4$ | $C_5$ | ... | $C_{m-1}$ | $C_m$ |
|-------|-------|-------|-------|-------|-------|-----|-----------|-------|
| $L_1$ | F     | F     | F     | F     | F     | ... | F         | F     |
| $L_2$ | F     | F     | F     | F     | F     | ... | F         | F     |
| $L_3$ |       |       |       |       |       |     |           |       |
| $L_4$ |       |       |       |       |       |     |           |       |
| $L_5$ |       |       |       |       |       |     |           |       |
| ...   |       |       |       |       |       |     |           |       |
| $L_n$ |       |       |       |       |       |     |           |       |

With reference to the above "Frequency matrix of binary image," the horizontal dimension may correspond to the lines, "L1" to "Ln," and vertical dimension corresponds to the columns, "C1" to "Cm," in the binary image. For exemplary purposes, it may be assumed that for the lines "L1" and "L2," the image processor 204 has determined the frequency values as "F," based on execution of the steps 308 to 320, as explained above. It may be noted that the abovementioned example is for illustrative purpose and should not be construed to limit the scope of the disclosure.

Further, for relaying the estimated value, the image processor 204 may further execute the above steps 308 to 320 for each pixel in three lines, "L3," "L4," and "L5," and a column, "C1," of the binary image to determine the corresponding frequency values, "FC," F1," and "F2," that may correspond to the "High Frequency" category for example, as shown in the "Current frequency matrix of binary image" below:

Current frequency matrix of binary image

|       | $C_1$ | $C_2$ | $C_3$ | $C_4$ | $C_5$ | ... | $C_{m-1}$ | $C_m$ |
|-------|-------|-------|-------|-------|-------|-----|-----------|-------|
| $L_1$ | F     | F     | F     | F     | F     | ... | F         | F     |
| $L_2$ | F     | F     | F     | F     | F     | ... | F         | F     |
| $L_3$ | $F_C$ |       |       |       |       | ... |           |       |
| $L_4$ | $F_1$ |       |       |       |       | ... |           |       |
| $L_5$ | $F_2$ |       |       |       |       | ... |           |       |
| ...   | ...   |       |       |       |       | ... |           |       |
| $L_n$ |       |       |       |       |       | ... |           |       |

With reference to the above "Current frequency matrix of binary image," for exemplary purposes, it may be assumed that "C" at location (L3, C1) is the current pixel-of-interest, and "N1" and "N2" are two pixels at locations (L4, C1) and (L5, C1), respectively. Based on execution of the steps 308 to 320, the image processor 204 may be configured to determine the frequency values of the pixels, "C," "N1," and "N2" as "FC," "F1," and "F2," as shown in the "Current frequency matrix of binary image" above. It may be noted that the abovementioned example is for illustrative purpose and should not be construed to limit the scope of the disclosure.

At step 322, it may be determined whether next pixels are available at pre-determined locations. In an embodiment, the image processor 204 may determine whether next pixels are available at pre-determined locations. In an embodiment, when the next pixels are available at pre-determined locations, the control passes back to step 308 for next pixel-of-interest and steps 308 through 320 are executed for each pixel in the pre-determined count of locations. In an embodiment, when the next pixels are not available at the pre-determined locations, the control passes to step 324.

At step 324, when no next pixels are available at the pre-determined count of locations, a mode value, corresponding to a plurality of frequency values of pixels-of-interest in the plurality of first pixel blocks, may be determined. In an embodiment, the image processor 204 may be configured to determine the mode value corresponding to the plurality of frequency values of the pixels-of-interest in the plurality of first pixel blocks. For example, the image processor 204 may determine the mode value, such as "M," corresponding to a plurality of frequency values, such as "F," "FC," "F1," and "F2," of pixels-of-interest at eleven neighborhoods ((L1, C1), . . . , (L1, C4), (L2, C1), . . . , (L2, C4), (L3, C1), (L4, C1), and (L5, C1)) as shown in the matrix, "Current frequency matrix of binary image." The image processor 204 may determine the mode value, "M," to be "8," as the frequency value "F" (that may correspond to the "Low Frequency" category) occurs eight times as compared to single occurrences of frequency values "FC," "F1," and "F2" (that may correspond to the "High Frequency" category) in the matrix, "Current frequency matrix of binary image." It may be noted that the abovementioned example for eleven neighborhoods is for illustrative purpose and should not be construed to limit the scope of the disclosure.

At step 326, it may be determined whether the mode value exceeds a pre-determined threshold mode value. In an embodiment, the image processor 204 in conjunction with the comparator 210, may be configured to determine whether the mode value exceeds the pre-determined threshold mode value. In an embodiment, the pre-determined threshold mode value may be an experimental value, such as "7." In an embodiment, when the mode value "M" is less than the pre-determined threshold mode value, control passes to step 328. At step 328, the current pixel-of-interest is determined at next location, i.e., (L3, C2), as shown in the matrix, "Current frequency matrix of binary image." Control passes back to step 320. In an embodiment, when the mode value "M" exceeds the pre-determined threshold mode value, control passes to step 330.

At step 330, when the mode value "M" exceeds the pre-determined threshold mode value, other plurality of frequency values for other pixels-of-interest in other plurality of first pixel blocks may be estimated. In an embodiment, the image processor 204 may be configured to estimate other plurality of frequency values for other pixels-of-interest in other plurality of first pixel blocks. In accordance with the above example, the mode value "M" may be "8," as the frequency value "F" occurs eight times in eleven neighborhoods. In such a case, the image processor 204 may estimate other plurality of frequency values for other pixels at the locations ((L3, C2), . . . , (L3, Cm), (L4, C2), . . . , (L4, Cm), and (L5, C2), . . . , (L5, Cm)) with the frequency value, "F." It may be noted that the abovementioned example is for illustrative purpose and should not be construed to limit the scope of the disclosure.

At step 332, the estimated other plurality of frequency values, corresponding to the other pixels-of-interest in the other plurality of first pixel blocks, may be classified in the pre-defined set of categories. In an embodiment, the image processor 204 may be configured to classify the estimated other plurality of frequency values, corresponding to the other pixels-of-interest, in the pre-defined set of categories. For example, the image processor 204 may be configured to classify the estimated other plurality of frequency values for other pixels at the locations ((L3, C2), . . . , (L3, Cm), (L4, C2), . . . , (L4, Cm), and (L5, C2), . . . , (L5, Cm)) with frequency value, "F," which corresponds to the "Low Frequency" category.

At step 334, one or more frequency tags may be assigned to one or more portions of the binary image. At least one of the one or more portions may correspond to the pixels-of-interest in the plurality of first pixel blocks and the other pixels-of-interest in the other plurality of first pixel blocks. The one or more frequency tags may be assigned based on the determined plurality of frequency values of the pixels-of-interest in the plurality of first pixel blocks and the estimated other plurality of frequency values of the other pixels-of-interest in the other plurality of first pixel blocks. In an embodiment the image processor 204 may be configured to assign the one or more frequency tags based on the determined plurality of frequency values of the pixels-of-interest in the plurality of first pixel blocks and the estimated other plurality of frequency values of the other pixels-of-interest in the other plurality of first pixel blocks. In an embodiment, a single frequency tag may be determined for the full binary image. In another embodiment, different frequency tags may be determined for different portions of the binary image. For example, the frequency tags, such as "100 LPI Tag," "130 LPI Tag," or "150 LPI Tag," may be assigned to the one or more portions of the binary image.

At step 336, one or more image processing operations may be performed on the binary image. The one or more image processing operations may be performed, based on the assigned one or more frequency tags. In other words, the one or more image processing operations may be performed, based on the determined plurality of frequency values corresponding to the pixels-of-interest in the plurality of first pixel blocks and the estimated other plurality of frequency values corresponding to the other pixels-of-interest in the other plurality of first pixel blocks. In an embodiment, the image processor 204 may be configured to perform one or more image processing operations on the binary image. The one or more image processing operations may be performed, based on the determined plurality of frequency values corresponding to the pixels-of-interest and the estimated other plurality of frequency values. For example, the one or more image processing operations may be performed, based on the one or more frequency tags, such as "100 LPI Tag," "130 LPI Tag" or "150 LPI Tag" assigned to the one or more portions of the binary image. Examples of the one or more image processing operations may include, but are not limited to, de-screening and/or filtering operations. Control passes to end step 338.

FIG. 4 illustrates an exemplary scenario of an image processing method for classification of halftone frequencies, in accordance with at least one embodiment. FIG. 4 is described in conjunction with elements from FIGS. 1-3. With reference to FIG. 4, there is shown an exemplary scenario 400 that includes an input image 402, a set of halftone frequency tagged images 404. The set of halftone frequency tagged images 404 may include a first tagged image 406, a second tagged image 408, and a third tagged image 410. There are further shown halftone frequency tags, such as a first frequency tag 406A, a second frequency tag 408A, and a third frequency tag 410A, corresponding to the first tagged image 406, the second tagged image 408, and the third tagged image 410, respectively. There are further shown various components of an exemplary MFD, such as a printer, that may be similar to the components of the MFD 104, as described in FIG. 2.

With reference to the exemplary scenario 400, the processor 202 may receive a request from a requestor-computing device. The request may include the input image 402 and a print instruction for printing the input image 402. The input image 402 may correspond to a low resolution image, such as "110 LPI" frequency image. The received input image 402 may correspond to a color scheme, such as RGB. The processor 202 may communicate the received input image 402 to the image processor 204.

The image processor 204 may convert the received input image 402 to the binary image (not shown). The image processor 204 may determine a plurality of pixel blocks, each comprising a plurality of pixels, such as "33" pixels. The image processor 204 may convert the pixel values of a pixel block into first pixel values of a first pixel block, based on a threshold value. The image processor 204 may compute the threshold value for a pixel-of-interest in the first block of pixels, based on a weighted difference between maximum and minimum pixel values of the pre-determined neighbor pixels of the pixel-of-interest. The image processor 204 may further determine the count of transitions in the first pixel values of the first pixel block to be exceeding a pre-determined value, such as "0." Accordingly, the image processor 204 may generate a second pixel block comprising second pixel values, based on pixel shifting in the first pixel block by a pre-determined count, such as "8." The image processor 204 may further determine a third pixel block, including the third pixel values, based on the pre-specified operation, such as logical "OR" operation, on the first pixel values of the first pixel block and the second pixel values of the second pixel block.

The image processor 204 may further determine a frequency value for the pixel-of-interest in the first pixel block based on a count of "0s" of third pixel values, i.e., "5," in the third pixel block, which is in the range of "0" and "6." Consequently, the image processor 204 may determine the frequency value of the first pixel block to be "100 LPI." Once the frequency value is determined for the first pixel block, the same steps are repeated to determine the frequency value for next pixel block. After determining frequency values of pre-determined pixels, such as all the pixels in the first two lines and three pixels in a column, as shown in the "Current frequency matrix of binary image," the image processor 204 may determine the mode value, which may exceed a pre-determined threshold mode value, such as "7." Accordingly, the image processor 204 may relay the estimation of other plurality of frequency values based on the mode value.

In an embodiment, the image processor 204 may be configured to classify the determined frequency values and the estimated other plurality of frequency values, in the pre-defined category "Low Frequency." Accordingly, the image processor 204 may assign the first frequency tag 406A, such as "100 LPI Tag," and generate the first tagged image 406. The image processor 204 may further assign the second frequency tag 408A, such as "133 LPI Tag," and generate the second tagged image 408. The image processor 204 may further assign the third frequency tag 410A, such as "150 LPI Tag," and generate the third tagged image 410. It may be noted that as the input image 402 corresponds to "110 LPI" frequency image (that lies between "100 LPI" and "133 LPI"), the visibility of the first tagged image 406 and the second tagged image 408 is above a threshold level, and thus perceivable. However, for the third tagged image 410, the visibility is below the threshold level, and thus non-perceivable, as there is not any component of the input image 402 that is around "150 LPI." The image processor 204 may de-screen the first tagged image 406, the second tagged image 408, or the third tagged image 410 by utilizing a second de-screening algorithm and a third de-screening algorithm, respectively.

The disclosed embodiments encompass numerous advantages. Various embodiments of the disclosure lead to an image processing method and system for classification of halftone frequencies. The classification of halftone frequencies may be further applicable to different halftone frequency images with different plane angles. Through various embodiments of the disclosure, an input image is converted into a binary image for which halftone frequencies may be classified, based on simple time domain operations, such as logical and arithmetic operations. As the change in halftone frequency between pixels in mostly minimal, the proposed image processing method and system may relay the estimation, based on similarities of frequency values of neighborhood pixels, thereby reducing the computation. Further, various operations, as disclosed in various embodiments, may be performed in parallel, thereby speeding up the computation. Furthermore, as multimedia processor manufacturers are releasing software developer's kit (SDKs) for image processing functionality, the disclosed image processing method and system protect image path functions with parallel computing capabilities may be quite advantageous.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described may also be implemented using only software programming or using only hardware or by a varying combination of the two techniques. The disclosure is independent of the programming language and the operating system used in the computers. The instructions for the disclosure may be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in various operating systems and platforms including, but not limited to, 'Unix', DOS', 'Android', 'Symbian', and 'Linux'.

The programmable instructions may be stored and transmitted on a computer-readable medium. The disclosure may also be embodied in a computer program product comprising a computer-readable medium, or with any product capable of implementing the above methods and systems, or the numerous possible variations thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Various embodiments of the methods and systems for processing binary images to classify halftone frequencies have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims may encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. An image processing method for classification of halftone frequencies, the image processing method comprising:
converting, by an image processor in a multifunction device, pixel values of a first block of pixels, associated with a pixel-of-interest, into first pixel values, wherein the first block of pixels is one of a plurality of first block of pixels in a binary image;
generating, by the image processor in the multifunction device, a second block of pixels comprising second pixel values based on pixel shifting in the first block of pixels of the plurality of first block of pixels by a first pre-determined value;
determining, by the image processor in the multifunction device, a frequency value for the pixel-of-interest in the first block of pixels based on a count of a pre-specified type of third pixel values in a corresponding third block of pixels, wherein the third pixel values in the third block of pixels are determined based on a pre-specified operation on the first pixel values of the first block of pixels and the second pixel values of the second block of pixels;
estimating, by the image processor in the multifunction device, other plurality of frequency values for other pixels-of-interest in other plurality of first block of pixels when a mode value, corresponding to a plurality of frequency values of pixels-of-interest in the plurality of first block of pixels, exceeds a pre-determined threshold mode value; and
performing, by the image processor in the multifunction device, one or more image processing operations on the binary image based on the determined plurality of frequency values corresponding to the pixels-of-interest in the plurality of first block of pixels and the estimated other plurality of frequency values corresponding to the other pixels-of-interest in the other plurality of first block of pixels.

2. The image processing method of claim 1, further comprising classifying, by the image processor, the estimated other plurality of frequency values corresponding to the other pixels-of-interest in the other plurality of first block of pixels in pre-defined set of categories.

3. The image processing method of claim 2, further comprising assigning, by the image processor, a frequency tag to the pixels-of-interest in the plurality of first block of pixels and the other pixels-of-interest in the other plurality of first block of pixels based on the determined plurality of frequency values of the pixels-of-interest in the plurality of first block of pixels and the estimated other plurality of frequency values of the other pixels-of-interest in the other plurality of first block of pixels.

4. The image processing method of claim 1, wherein the first block of pixels is a valid first block comprising the pixel-of-interest, a first set and a second set of pre-determined neighbor pixels of the pixel-of-interest, wherein count of the first set and the second set of the pre-determined neighbor pixels is equal towards both sides of the pixel-of-interest.

5. The image processing method of claim 4, wherein the conversion of the pixel value into the first pixel values in the first block of pixels is based on a threshold value, wherein the threshold value is computed based on weighted difference between maximum and minimum pixel values of the pre-determined neighbor pixels of the pixel-of-interest.

6. The image processing method of claim 1, wherein the pixel shifting is performed in the first block of pixels of the plurality of first block of pixels when a count of transitions of the first pixel values in the first block of pixels exceeds a second pre-determined value.

7. The image processing method of claim 1, further comprising invalidating, by the image processor, the first block of pixels when a count of transitions in the first pixel values in the first block of pixels is less than a second pre-determined value.

8. The image processing method of claim 1, further comprising converting, by the image processor, an input image to the binary image, wherein each of a plurality of binary lines in the binary image comprises a plurality of pixels.

9. The image processing method of claim 1, wherein the first pixel values in the first block of pixels correspond to binary values.

10. The image processing method of claim 1, wherein the one or more image processing operations correspond to de-screening and/or filtering operations.

11. An image processing system for classification of halftone frequencies, the system comprising:
an image processor in a multifunction device configured to:
convert pixel values of a first block of pixels, associated with a pixel-of-interest, into first pixel values, wherein the first block of pixels is one of a plurality of first block of pixels in a binary image;
generate a second block of pixels comprising second pixel values based on pixel shifting in the first block of pixels of the plurality of first block of pixels by a first pre-determined value;
determine a frequency value of the pixel-of-interest in the first block of pixels based on a count of a pre-specified type of third pixel values in a corresponding third block of pixels, wherein the third pixel values in the third block of pixels are determined based on a pre-specified operation on the first pixel values of the first block of pixels and the second pixel values of the second block of pixels;
estimate another plurality of frequency values for another pixels-of-interest in another plurality of first block of pixels when a mode value, corresponding to a plurality of frequency values of pixels-of-interest in the plurality of first block of pixels, exceeds a pre-determined threshold mode value; and
perform one or more image processing operations on the binary image based on the determined plurality of frequency values corresponding to the pixels-of-interest in the plurality of first block of pixels and the estimated other plurality of frequency values corresponding to the other pixels-of-interest in the other plurality of first block of pixels.

12. The image processing system of claim 11, wherein the image processor is further configured to classify the estimated other plurality of frequency values corresponding to the other pixels-of-interest in the other plurality of first block of pixels in pre-defined set of categories.

13. The image processing system of claim 12, wherein the image processor is further configured to assign a frequency tag to the pixels-of-interest in the plurality of first block of pixels and the other pixels-of-interest in the other plurality of first block of pixels based on the determined plurality of frequency values of the pixels-of-interest in the plurality of first block of pixels and the estimated other plurality of frequency values of the other pixels-of-interest in the other plurality of first block of pixels.

14. The image processing system of claim 11, wherein the first block of pixels is a valid first block comprising the pixel-of-interest, a first set and a second set of pre-determined neighbor pixels of the pixel-of-interest, wherein count of the first set and the second set of the pre-determined neighbor pixels is equal towards both sides of the pixel-of-interest.

15. The image processing system of claim 11, wherein the conversion of the pixel value into the first pixel values in the first block of pixels is based on a threshold value, wherein the threshold value is computed based on weighted difference between maximum and minimum pixel values of the pre-determined neighbor pixels of the pixel-of-interest.

16. The image processing system of claim 11, wherein the pixel shifting is performed in the first block of pixels of the plurality of first block of pixels when a count of transitions of the first pixel values in the first block of pixels exceeds a second pre-determined value.

17. The image processing system of claim 11, wherein the image processor is further configured to invalidate the first block of pixels when a count of transitions in the first pixel values in the first block of pixels is less than a second pre-determined value.

18. The image processing system of claim 11, wherein the image processor is further configured to convert an input image to the binary image, wherein each of a plurality of binary lines in the binary image comprises a plurality of pixels.

19. A non-transitory computer-readable storage medium having stored thereon, a set of computer-executable instructions for causing a computer comprising an image processor to perform steps comprising:

converting, by the image processor in a multifunction device, pixel values of a first block of pixels, associated with a pixel-of-interest, into first pixel values, wherein the first block of pixels is one of a plurality of first block of pixels in a binary image;

generating, by the image processor, a second block of pixels comprising second pixel values based on pixel shifting in the first block of pixels of the plurality of first block of pixels by a first pre-determined value;

determining, by the image processor, a frequency value for the pixel-of-interest in the first block of pixels based on a count of a pre-specified type of third pixel values in a corresponding third block, wherein the third pixel values in the third block of pixels are determined based on a pre-specified operation on the first pixel values of the first block of pixels and the second pixel values of the second block of pixels;

estimating, by the image processor, other plurality of frequency values for other pixels-of-interest in other plurality of first block of pixels when a mode value, corresponding to a plurality of frequency values of pixels-of-interest in the plurality of first block of pixels, exceeds a pre-determined threshold mode value; and performing, by the image processor, one or more image processing operations on the binary image based on the determined plurality of frequency values corresponding to the pixels-of-interest in the plurality of first block of pixels and the estimated other plurality of frequency values corresponding to the other pixels-of-interest in the other plurality of first block of pixels.

* * * * *